(12) United States Patent
Manning et al.

(10) Patent No.: US 6,203,209 B1
(45) Date of Patent: Mar. 20, 2001

(54) OVERMOLDED FIBER OPTIC CONNECTOR FERRULE CAPILLARY HAVING OCTAGONAL COLLAR

(75) Inventors: Randy Marshall Manning, New Cumberland; Thomas Ralph Fawcett, Jr., Harrisburg, both of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 08/410,029

(22) Filed: Mar. 24, 1995

(51) Int. Cl.$^7$ ................. G02B 6/00; G02B 6/36
(52) U.S. Cl. ............................................. 385/78
(58) Field of Search .................. 385/56, 60, 76, 385/77, 78, 80, 84, 79

(56) References Cited

U.S. PATENT DOCUMENTS

| 4,205,896 | * | 6/1980 | Borsuk | 385/78 |
|---|---|---|---|---|
| 4,822,129 | * | 4/1989 | Webb | 385/78 |
| 4,934,785 | | 6/1990 | Mathis et al. | 350/96.21 |
| 5,131,063 | * | 7/1992 | Monroe et al. | 385/78 |
| 5,375,183 | | 12/1994 | Edwards et al. | 385/60 |
| 5,394,497 | | 2/1995 | Erdman et al. | 385/78 |

FOREIGN PATENT DOCUMENTS

| 2 339 104 | 6/1991 | (GB) . |
|---|---|---|
| 63-172106 | 7/1988 | (JP) . |
| WO 87/01464 | 3/1987 | (WO) . |

* cited by examiner

Primary Examiner—Akm E. Ullah

(57) ABSTRACT

A fiber optic ferrule comprises a precision ferrule capillary (2) and a ferrule base (10). The ferrule capillary (2) has a polygonal collar (6). The ferrule base (10) is molded over the collar (6). The ferrule base (10) and the collar (6) cooperate to resist rotational and axial displacement of the ferrule capillary relative to the ferrule base (10).

9 Claims, 2 Drawing Sheets

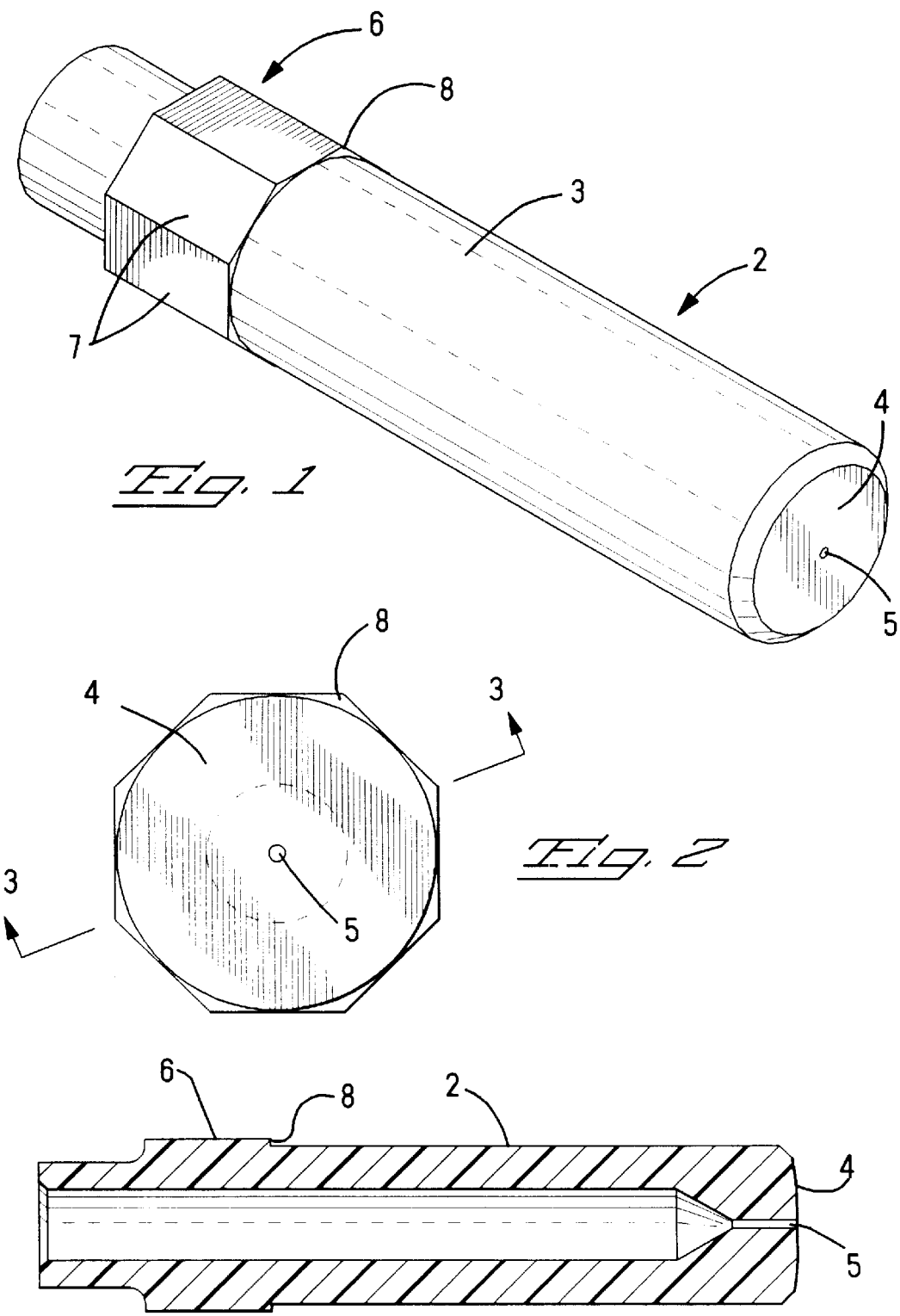

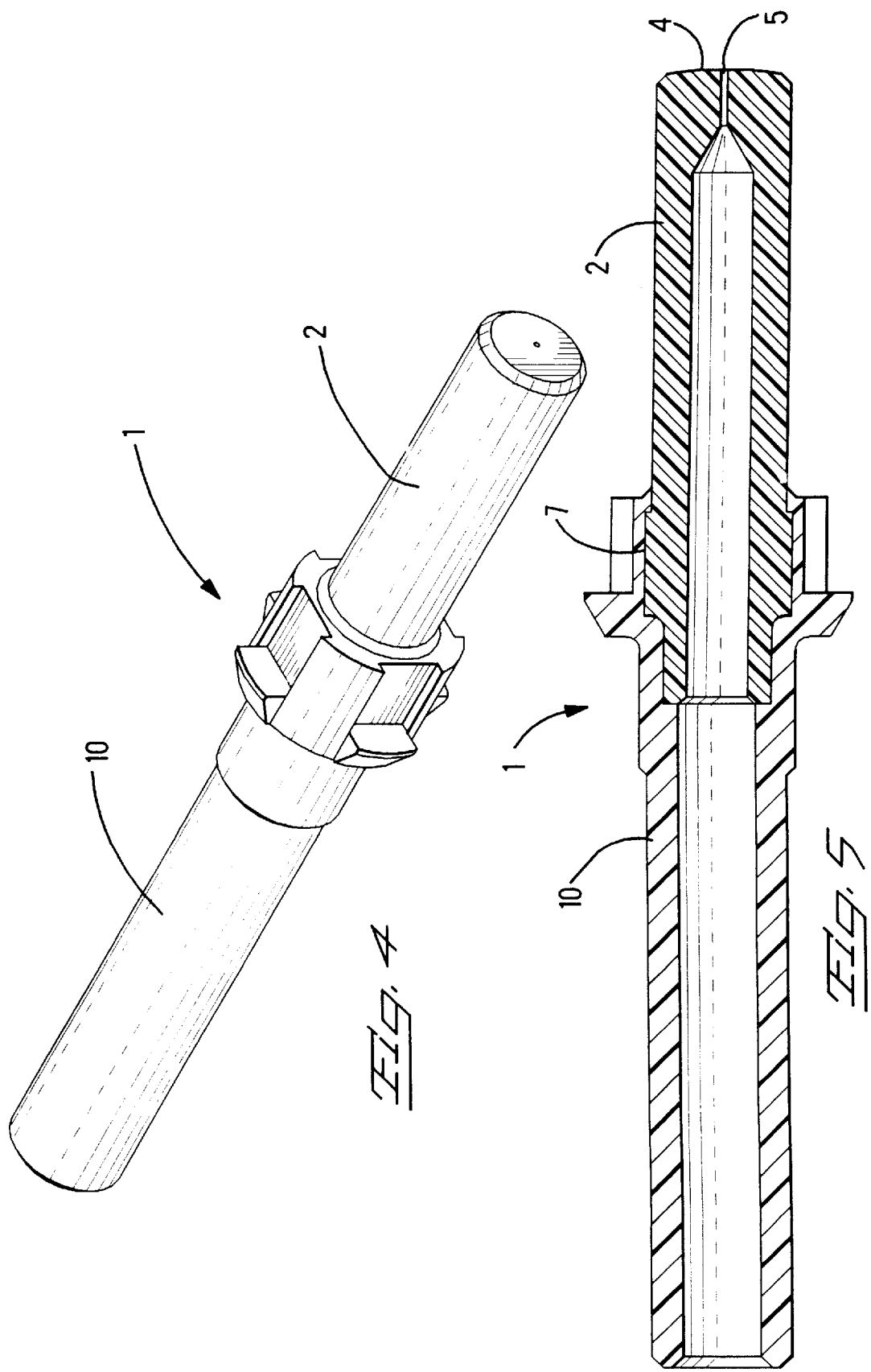

OVERMOLDED FIBER OPTIC CONNECTOR FERRULE CAPILLARY HAVING OCTAGONAL COLLAR

FIELD OF THE INVENTION

The present invention relates to fiber optic ferrules and more particularly relates to ferrule capillaries used in fiber optic ferrules.

BACKGROUND OF THE INVENTION

Fiber optic connectors typically comprises a ferrule captivated by a coupling mechanism. The geometry of the coupling mechanism is generally independent of the ferrule. Ferrules may comprise a precision ferrule capillary providing a fiber retention and alignment function held by a ferrule base. Ferrule capillaries are known to be made of ceramic, metal and polymer. In the interest of minimizing fiber torsional stress, it is desirable that the ferrule capillary resist rotational displacement relative to the ferrule base at all times. During termination of a fiber optic connector, epoxy may be injected into a fiber passage internal to the ferrule. The process of injecting the epoxy subjects the ferrule capillary to an axial force, typically 5 lbs or less, relative to the ferrule base. It is desirable that the ferrule capillary resist axial movement in response to this "push out" force. As miniaturization is often an issue, it is desirable to have the axial and rotational antidisplacement features in a minimum amount of volumetric space.

A known ferrule capillary has a cylindrical volume with a notch at a nonmating end cut transverse to a longitudinal axis of the cylindrical volume. A ferrule base is overmolded at the notched end and surroundingly engages the notch. The notch resists axial and rotational displacement of the ferrule capillary relative to the ferrule base. The notch further provides for miniaturization by obviating the need to increase the diameter of the ferrule capillary in order to include antidisplacement features. With respect to metal or ceramic ferrules overmolded by a base, the notch may be machined into the ferrule in a secondary operation prior to overmolding.

With respect to polymer ferrules, the notch feature is undesirable because a mold that creates the notch has a relatively large single discontinuity therein. Fiber optic connectors and in particular the ferrules used therein are precision parts. The molding process, therefore, should be carefully controlled in order attain a manufacturing process having acceptable yields. Large discontinuities in a mold cavity tend to disturb the flow of the molten polymer as it enters the cavity during the molding process. This discontinuity makes it difficult to sufficiently control the molding process. It is desirable, therefore, for a polymer ferrule to be made in a mold wherein the number and size of discontinuities is minimized to streamline material flow.

An example of an overmolded ferrule is found in U.S. Pat. No. 5,375,183, the teachings of which are hereby incorporated by reference. A ferrule capillary comprises a cylindrical collar. The collar is overmolded by a base to form a fiber optic ferrule. The ferrule base should have a sufficient wall thickness to retain the ferrule capillary and to resist axial and rotational displacement thereto. In a competing concern, it is desirable to minimize the maximum outer diameter of a ferrule due to space limitations internal to various fiber optic connectors. It is desirable, therefore, to have a ferrule having a relatively small maximum outer diameter with sufficient retention of the ferrule capillary within the base.

BRIEF DESCRIPTION OF THE DRAWINGS

FIG. 1 is a perspective view of a ferrule capillary according to the teachings of the present invention.

FIG. 2 is a plan view of an end face of a ferrule capillary according to the teachings of the present invention.

FIG. 3 is a cross sectional view of a ferrule capillary according to the teachings of the present invention sectioned along the length of the ferrule at the axis labelled 3—3 in FIG. 2.

FIG. 4 is a perspective view of a ferrule base molded over a ferrule capillary.

FIG. 5 is a cross sectional view of the ferrule shown in FIG. 4.

SUMMARY OF THE INVENTION

It is an object of the present invention that a polymer ferrule may be made in a mold that minimizes the flow disturbance during the molding process.

It is an object of the present invention that a ferrule capillary overmolded by a ferrule base resists rotation relative to the base.

It is an object of the present invention that a ferrule capillary overmolded by a ferrule base can withstand a push out force resisting axial movement of the capillary ferrule relative the base.

It is an object of the present invention to minimize the maximum outer diameter of a portion of the ferrule capillary overmolded by the ferrule base.

A fiber optic ferrule comprises a ferrule capillary having an polygonal collar and a ferrule base retainably engaging the ferrule capillary.

It is another feature of the present invention that a ferrule capillary has an octagonal collar.

It is another feature of the present invention that the ferrule capillary comprises a cylindrical alignment member adjacent the collar and sides of the collar are positioned tangential to the cylindrical outer diameter.

It is an advantage of the present invention that an polygonal collar resists rotational displacement relative to a base retainably engaging it.

It is an advantage of the present invention that an polygonal collar overmolded by a base resists axial displacement when subjected to a force of at least 45 lbs.

It is an advantage of the present invention that interference shoulders of an octagonal collar are sufficient to withstand a minimum push out force of 45 lbs and concurrently minimize the maximum outer diameter of the collar.

It is an advantage of the present invention that a mold for a polymer ferrule capillary has fewer and smaller discontinuities therein, rendering the molding process more easily controlled.

DETAILED DESCRIPTION OF THE PREFERRED EMBODIMENT

With reference to FIGS. 4 and 5, a fiber optic ferrule 1 for use in a fiber optic connector (not shown) comprises a precision molded polymer ferrule capillary 2 overmolded by a ferrule base 10. In a preferred embodiment, the ferrule capillary 2 is made of polyethersulfone sold by Amoco under the trademark RADEL, and the ferrule base is made of thermoplastic polyester sold by General Electric plastics under the trademark VALOX DR-48.

With reference to FIG. 1, the ferrule capillary 2 comprises a substantially cylindrical alignment member 3 having a chamfered end face 4 at a mating end and a fiber passage 5 therethrough defining a longitudinal axis. The alignment member 3 is adjacent a polygonal collar 6. In a preferred embodiment, the collar is octagonal. Each of eight sides 7 of the collar 6 intersect with adjacent sides 7 to form eight interference shoulders 8. As best shown in FIG. 2, the sides 7 are positioned tangentially to the outer diameter of the alignment member 3 in a preferred embodiment. The interference shoulders 8 extend radially past the outer diameter of the alignment member 3 defining a maximum ferrule capillary outer diameter. When the ferrule base 10 is overmolded onto the ferrule capillary, the molten polymer of the base envelopes the collar 6. The base polymer flows around the interference shoulders 8 conforming to the sides 7 of the ferrule capillary 2. The flat of the sides 7 and the conforming material of the base engage each other resisting rotational displacement of the ferrule capillary 2 relative to the ferrule base 10. The tangential positioning of the sides 7 of the collar 6 minimize the maximum outer diameter of the collar. With the maximum outer diameter of the collar 6 thus minimized, the overmolded ferrule base 10 is also minimized while having a wall thickness capable of providing sufficient axial interference to withstand push out forces of 45 lbs or more. It is preferred that the parting line of the mold for the precision ferrule capillary 2 be at the junction between the interference shoulders 8 and the alignment member 3.

We claim:

1. A fiber optic ferrule comprising:
    a ferrule capillary having a polygonal collar and a ferrule base retainably engaging said ferrule capillary.

2. The fiber optic ferrule as recited in claim 1 wherein said ferrule capillary further comprises a cylindrical alignment member adjacent said collar and wherein sides of said collar are positioned tangentially to an outer diameter of said cylindrical alignment member.

3. The fiber optic ferrule as recited in claim 1 wherein said collar is octagonal.

4. The fiber optic ferrule as recited in claim 1 wherein said ferrule capillary is overmolded by said base.

5. The fiber optic ferrule as recited in claim 2 wherein said ferrule capillary is overmolded by said base.

6. The fiber optic ferrule as recited in claim 3 wherein said ferrule capillary further comprises a cylindrical alignment member adjacent said collar and wherein sides of said collar are positioned tangentially to an outer diameter of said cylindrical alignment member.

7. The fiber optic ferrule as recited in claim 6 wherein said collar is overmolded by said base.

8. The fiber optic ferrule as recited in claim 3 wherein said collar is overmolded by said base.

9. A fiber optic ferrule comprising:
    a ferrule capillary having an enlarged collar, said enlarged collar having at least one flat side thereon and a ferrule base retainably engaging said collar.

* * * * *